Oct. 25, 1960        J. W. TOMEK        2,957,482
PORTABLE COLLAPSIBLE SHELTER
Filed July 11, 1958                                4 Sheets-Sheet 1
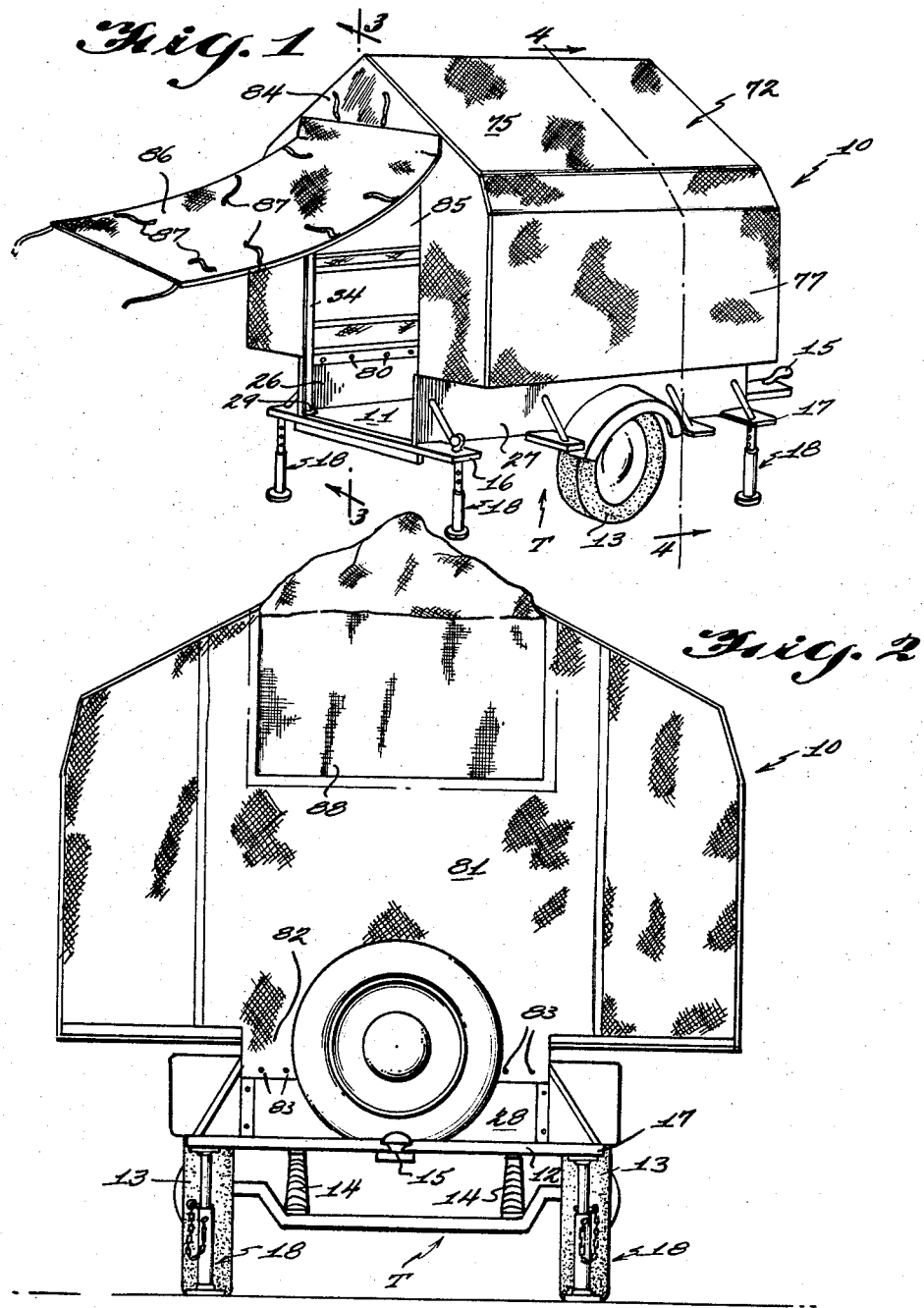
INVENTOR.
JOHN W. TOMEK
BY
Kimmel & Crowell
ATTORNEYS

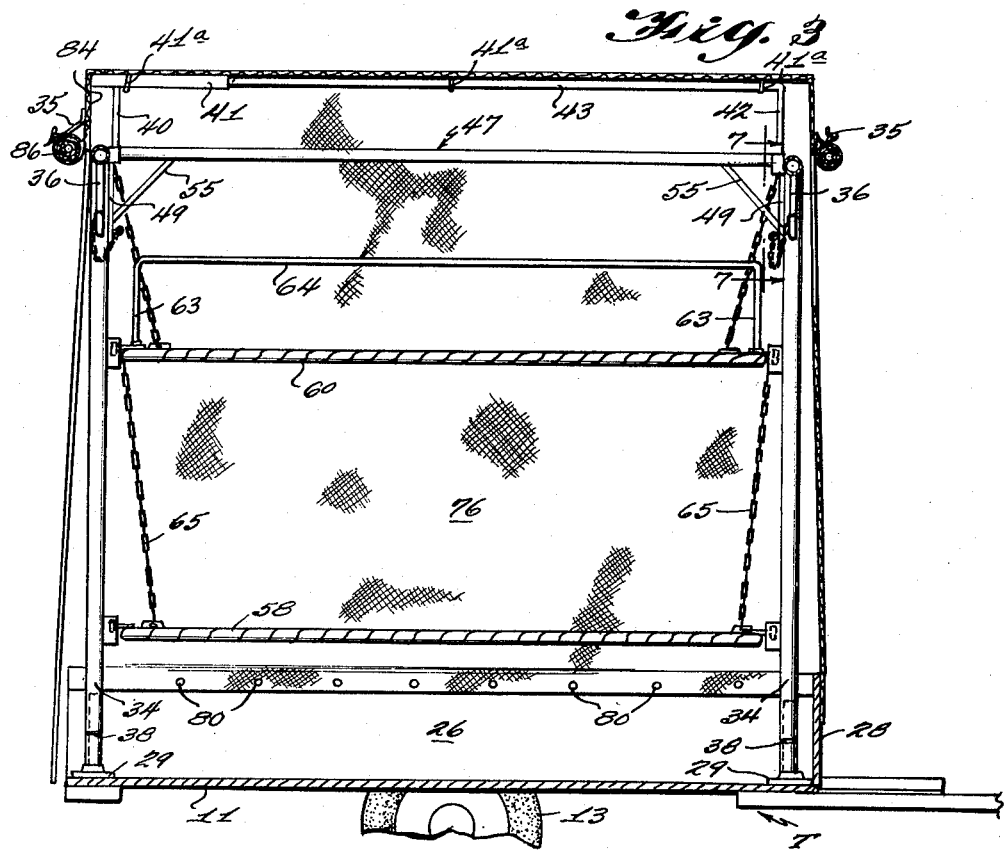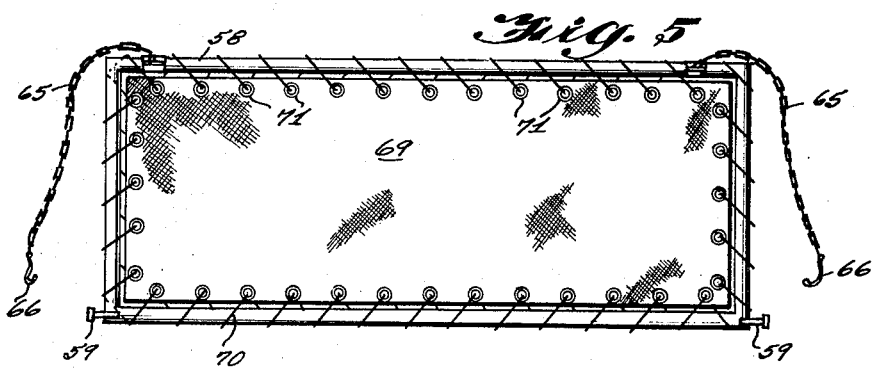

Oct. 25, 1960 J. W. TOMEK 2,957,482
PORTABLE COLLAPSIBLE SHELTER
Filed July 11, 1958 4 Sheets-Sheet 3
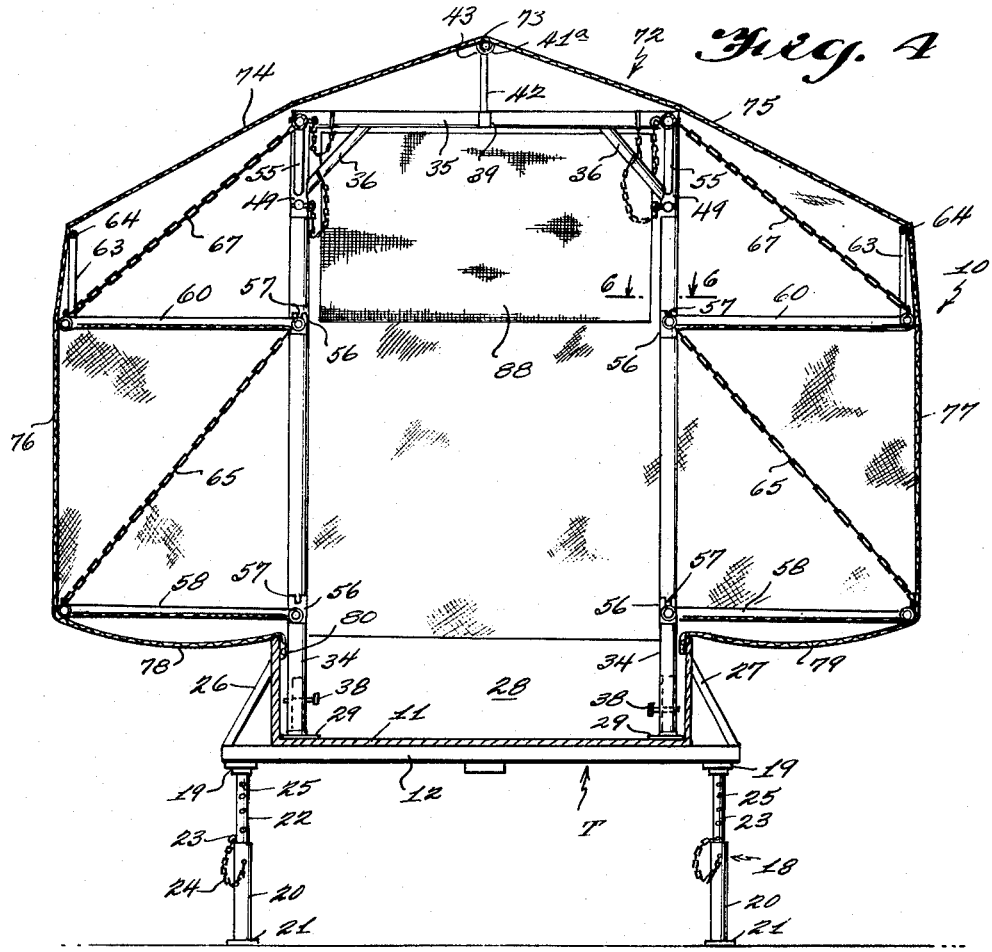
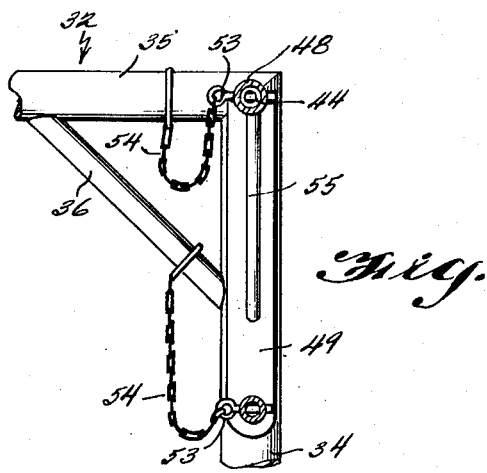
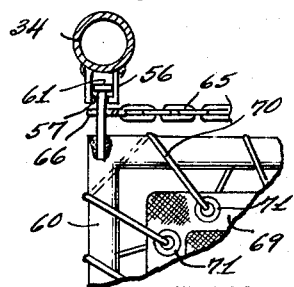
INVENTOR.
JOHN W. TOMEK
BY
Kimmel & Crowell
ATTORNEYS Oct. 25, 1960  J. W. TOMEK  2,957,482
PORTABLE COLLAPSIBLE SHELTER
Filed July 11, 1958  4 Sheets-Sheet 4
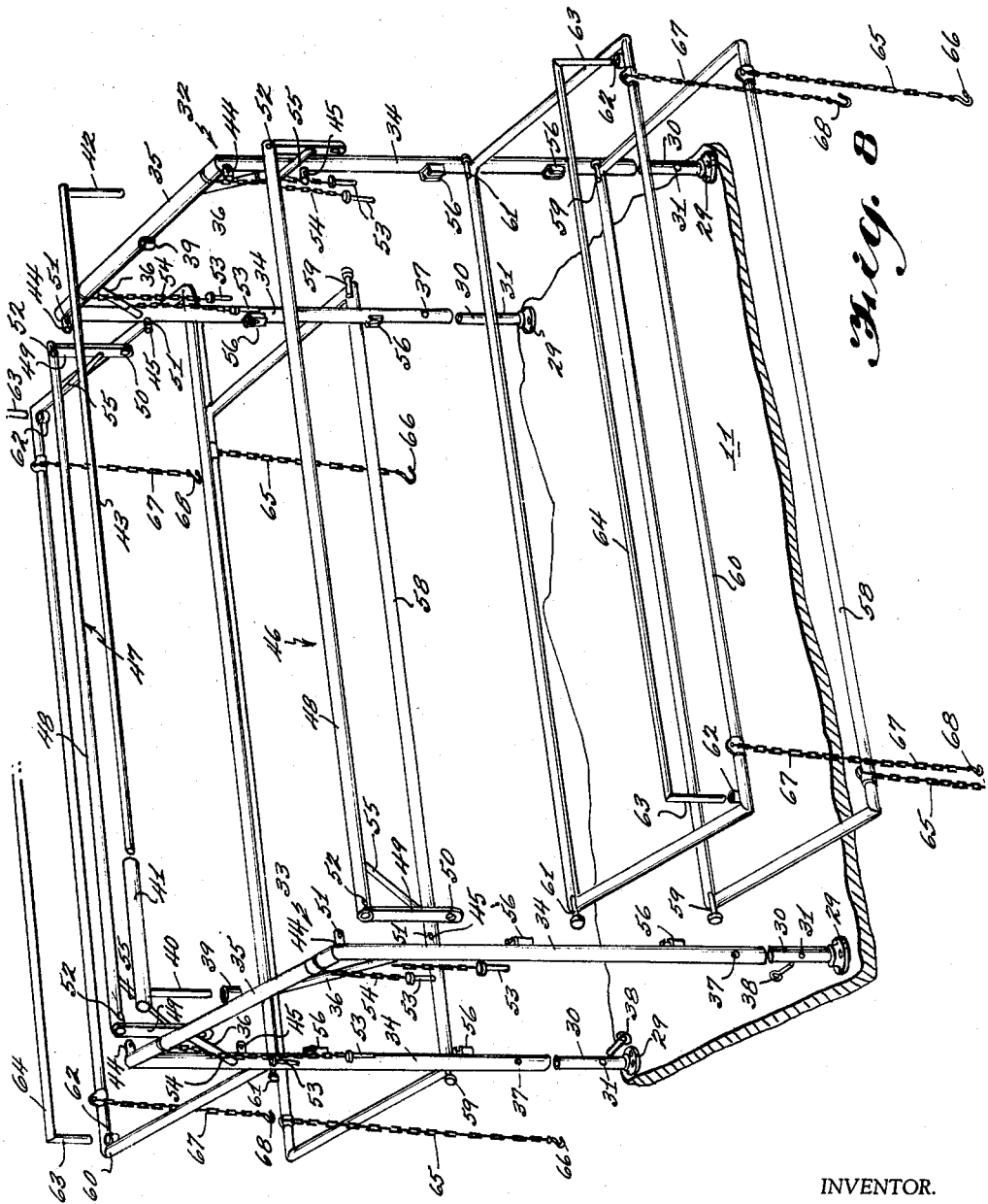
INVENTOR.
JOHN W. TOMEK
BY
Kimmel & Crowell
ATTORNEYS

United States Patent Office 2,957,482
Patented Oct. 25, 1960

2,957,482

PORTABLE COLLAPSIBLE SHELTER

John W. Tomek, 2920 Que St., Lincoln, Nebr.

Filed July 11, 1958, Ser. No. 748,084

1 Claim. (Cl. 135—1)

The present invention relates to portable collapsible shelters, and particularly to such shelters which can be collapsed into a small space for travel.

The primary object of the invention is to provide a portable shelter which can be easily erected and collapsed to quickly convert the shelter from a compact arrangement for travel to an erected arrangement for camping.

Another object of the invention is to provide a portable shelter of the class described above which can be erected completely by hand without requiring tools of any kind.

A further object of the invention is to provide a shelter of the class described above having a plurality of sleeping bunks mounted therein.

A still further object of the invention is to provide a shelter of the class described above in which a vehicle bed serves as the floor of the shelter and the support for a collapsible cover of the shelter.

Another object of the invention is to provide a shelter of the class described above which is inexpensive to manufacture, convenient to use, and which is effective in providing a towing or camping shelter.

A further object of the invention is to provide a portable shelter that can be erected on a 2 wheel trailer or pick-up truck body. When not used with the shelter, the trailer or pick-up truck can be used normally. Thus, the vehicle part of this shelter can be used with the shelter when needed and for other more general purposes when not needed with the shelter. The relatively small, permanently installed coupling attachments mounted on the vehicle, in no way hinder the usage of the vehicle for other purposes.

Another object of the invention is to provide a shelter stowable in a small enough space to leave ample space in the vehicle for all other camping gear necessary for extended camping trips.

A still further object of the invention is to provide a shelter that is light in weight for ease in erecting and collapsing and transporting on the road.

Other objects and advantages will become apparent in the following specification when considered in the light of the attached drawings, in which:

Figure 1 is a perspective view of the invention illustrated in erected position;

Figure 2 is a front elevation of the invention;

Figure 3 is an enlarged fragmentary longitudinal sectional view taken along the line 3—3 of Figure 1, looking in the direction of the arrows, with the rear flap shown in closed position;

Figure 4 is an enlarged fragmentary transverse section taken along the line 4—4 of Figure 1, looking in the direction of the arrows;

Figure 5 is a plan view of one of the beds forming part of the invention;

Figure 6 is an enlarged fragmentary horizontal section taken along the line 6—6 of Figure 4, looking in the direction of the arrows;

Figure 7 is an enlarged fragmentary vertical section taken along the line 7—7 of Figure 3, looking in the direction of the arrows; and Figure 8 is an exploded perspective view of the canopy supporting frame and beds.

Referring now to the drawings in detail wherein like reference characters indicate like parts throughout the several figures, the reference numeral 10 indicates generally a portable shelter constructed in accordance with the invention.

The portable shelter 10 is adapted for use with a vehicle such as trailer T, or a pick-up truck body (not shown). The trailer T includes a generally rectangular horizontal floor 11 supported on a frame 12 carried by a pair of wheels 13 through conventional spring mountings 14. The forward end of the frame 12 has a trailer hitch 15 secured thereto for attaching the trailer T to a towing vehicle.

The frame 12 includes a rear transverse member 16 and forward transverse member 17 which extend horizontally beyond the side edges of the floor 11. A telescopic standard 18 is secured to the opposite ends of each of the transverse members 16, 17 by means of a floor flange 19 secured to the underside of each end of the transverse members 16, 17.

The telescopic standard 18 includes an outer tubular portion 20 having a base flange 21 on its lower end and an upper tubular portion 22 telescopically slidable in the poriton 20. A pin 23 is secured to the portion 20 by a chain 24 and is arranged to be selectively positioned in one of the vertically spaced bores 25 in the portion 22.

In using the telescopic standards 18, the trailer T is levelled and the upper portion 22 is threaded into the floor flange 19 and then the pin 23 is inserted in one of the bores 25 to support the upper portion 22 on the lower portion 20 in a position to maintain the trailer T level.

A pair of rigid sides 26, 27 extend upwardly from opposite side edges of the floor 11.

A front wall 28 is secured to the forward edge of the side walls 26, 27 and a rear wall (not shown) is adapted to be removably positioned between the rear ends of the side walls 26, 27 when desired.

When the exception of the telescopic standards 18, the trailer construction described above is conventional and is adapted to have portable shelter camping structure 10, described below, supported thereon.

The trailer T has a floor flange 29 secured to each of the four corners of the floor 11, as can be seen in Figure 8. A relatively short nipple 30 is threaded into each of the floor flanges 29 and extend perpendicularly upwardly with respect to the floor 11. Each of the nipples 30 are provided with transverse bores 31, for reasons to be assigned.

A pair of U-shaped frames indicated generally at 32 and 33 are positioned respectively at the forward and rear ends of the trailer T and are of identical construction. Each of the frames 32, 33 includes a pair of spaced apart parallel tubular standards 34 integrally connected at their upper ends by a transverse horizontal member 35. Diagonal braces 36 extend across the corners between the standards 34 and the members 35 to assist in maintaining the frames 32, 33 rigid. The standards 34 are telescoped over the nipples 30 at their lower ends and are provided with transverse bores 37 which align with the bores 31 in the nipples 30, and a removable coupling pin 38 is inserted therein to secure the standards 34 to the nipples 30.

The transverse members 35 have an upright socket member 39 welded thereto intermediate the standards 34 on the inner side thereof, as best shown in Figure 8. A pin 40 is seated in one of the socket members 39 and has a tubular ridge-pole section 41 secured to the upper end thereof. A second pin 42 is seated in the opposite socket member 39 and has a tubular ridge-pole section 43 secured to the upper end thereof. The ridge-pole section 43 is telescopically received in the ridge-pole section 41, for reasons to be assigned.

A cylindrical boss 44 is secured to each of the upper corners of the frames 32, 33 in inwardly extending horizontal relation. A second cylindrical boss 45 is secured to each of the standards 34 in parallel relation to the bosses 44 and spaced equally therebelow.

A pair of longitudinal side members indicated generally at 46, 47 are identical in construction and include an elongated tubular member 48 which telescopes over the bosses 44 at its opposite ends and carries a perpendicularly depending plate 49 on each end thereof, with the plate 49 having a bore 50 through which the boss 45 extends.

The bosses 44 and 45 are each provided with bores 51, and the tubular members 48 have bores 52 formed in their opposite ends to align with the bores 51 in the bosses 44. Coupling pins 53 are secured to the frames 32, 33 by chains 54. The coupling pins 53 are inserted through the bores 51 of the bosses 44, 45 to lock the side members 46, 47 thereto. Diagonal braces 55 extend between the lower ends of the plate 49 and the adjacent portions of the tubular members 48.

The standards 34 are each provided with a pair of vertically spaced U-shaped brackets 56 welded thereto with each of the brackets 56 having a vertical slot 57 opening through the upper edge thereof.

A rigid generally rectangular tubular bed frame 58 has a pair of aligned headed pins 59 rigidly secured to opposite ends thereof along the inner edge thereof. The headed pins 59 are engaged in the slots 57 of a longitudinally aligned lower pair of the brackets 56 on each side of the trailer T.

A second pair of generally rectangular rigid tubular bed frames 60 are provided with aligned headed pins 61 on the inner edge thereof. The headed pins 61 are engaged in the slots 57 of a longitudinally aligned upper pair of brackets 56 with the bed frames 60 arranged in vertically spaced parallel relation above the bed frames 58.

The bed frames 60 are each provided with a vertically disposed socket member 62 welded in the outer corners thereof to receive the lower end portions of depending supports 63. A horizontal frame bar 64 is rigidly carried on the upper ends of the supports 63, as best seen in Figure 8.

A chain 65 is secured to each end of each of the bed frames 58 and have hooks 66 secured to the free ends thereof for engagement with the headed pins 61 to support the bed frames 58 in horizontal position, as illustrated in Figure 4.

Each end of each of the bed frames 60 has a chain 67 attached thereto with a hook 68 mounted on the free end of the chain 67. The hook 68 engages the end portion of the tubular member 48 to support the bed frame 60 in horizontal position.

A generally rectangular canvas 69 is lashed into each of the frames 58, 60 by a flexible rope 70 wrapped around the frame 58 and extending through grommets 71 in the canvas 69.

A canvas cover, generally indicated at 72, has an apex 73 supported on the ridge-pole sections 41, 43 and having oppositely sloping generally rectangular roof panels 74, 75 extending downwardly therefrom. The edges of the roof panels 74, 75 are supported on the bars 64 and have depending generally rectangular side panels 76, 77 integrally secured thereto. The lower ends of the side panels 76, 77 have generally horizontally inwardly extending bottom panels 78, 79 integrally secured thereto. The inner edges of the bottom panels 78, 79 engage over the upper edges of the side walls 26, 27 and are releasably secured thereto by securing elements 80. The bottom panels 78, 79 are relatively loose and sag below the bed frames 58 so that air space will be maintained between the canvas 69 and the panels 78, 79.

A front panel 81 is secured to the front edges of the roof panels 74, 75 and to the front edges of the side panels 76, 77 and has a depending flat portion 82 overlying the front wall 28 and releasably secured thereto by securing elements 83.

A rear panel 84 is secured to the rear edge of the roof panels 74, 75 and to the rear edge of the side panels 76, 77. The rear panel 84 has a generally rectangular opening 85 formed therein between the standards 34. A flap panel 86 is secured to the upper portion of the rear panel 84 and is arranged to overlie the opening in the rear panel 84. The flap panel 86 has a plurality of straps 87 secured thereto by means of which the flap panel 86 may be secured to the standards 34 to maintain the flap 86 in closed condition with respect to the rear panel 84, and by means of which the flap 86 may be tied in a rolled up condition when open. The front panel 81 is provided with a conventional ventilating flap 88 which may be rolled up and tied open when desired.

In the disassembled condition of the shelter 10, the U-shaped frames 32, 33, bed frames 58, 60, and all connecting portions thereof, as well as the canvas outer cover, can be carried on the floor 11 between the side walls 26, 27 or may be carried on top of a load of camping gear to provide a compact arrangement for road hauling of the trailer T. By placing the collapsed shelter 10 on top of the load, the erection and collapsing thereof may be accomplished without unloading the camping gear.

In erecting the portable shelter 10, the frames 32, 33 are first engaged over the nipples 30 and locked thereto by the coupling pins 38. The ridge pole sections 41, 43 are then slipped through spaced apart loops 41a secured to the inside of the canvas cover 72. The canvas cover 72 is then folded over the ridge pole sections 41, 43 and the pins 40, 42 supporting the telescopic ridge-pole sections 41, 43 are engaged in the sockets 39. The side members 46, 47 are then lifted up under the cover 72, spreading the canvas, and are engaged over their respective bosses 44, 45 and locked thereon by the coupling pins 53. The telescopic ridge-pole sections 41, 43 permit the frames 32, 33 to be moved sufficiently to permit the side members 46, 47 to be engaged rigidly with the frame members 32, 33.

The bed frames 60 positioned beneath the cover 72 and the support chains 67 are connected to the side members 46, 47 to support the frames 60 in horizontal position. The frame bars 64 are connected to the frames 60 and the frames 60 are pushed outwardly until the pins 61 drop in bracket 56. The bed frames 58 are then engaged in a like manner supported by chains 65. The cover 72 is then unfolded from the ridge pole 41, 43 and connected to the trailer T by securing elements 80.

It should be understood that the description above is only one method that can be followed in erecting the portable shelter 10, and it should be understood that it is possible to erect the trailer 10 by first placing the frames 32, 33 within the cover 72 and raising the cover 72 therewith. In this case the erection is completed then in the same manner as described above.

The structure of the portable shelter 10 is such that one man can assemble and disassemble the device to place it in condition for camping or for travelling. However, the operation is somewhat easier for two men.

Having thus described the preferred embodiments of the invention, it should be understood that numerous structural modifications and adaptations may be resorted to without departing from the scope of the appended claim.

What is claimed is:

A portable shelter for use with a generally rectangular vehicle body of the type having a floor comprising an upright tubular standard adapted to be secured to said floor adjacent each corner thereof, a pair of inverted U-shaped tubular frames telescopically engaging over and detachably secured to said standards at opposite ends of said floor in upright parallel relation, each of said U-shaped frames including a generally horizontal transverse member, a telescopic ridge pole extending longitudinally of said body, and means on said transverse members intermediate the opposite ends thereof releasably supporting said ridge pole at opposite ends thereof, a plurality of outwardly and longitudinally extending generally rectangular bed frames having their opposite ends at one side thereof supported on said U-shaped frames, flexible means extending outwardly and downwardly from said U-shaped frames supporting the other side of each of said bed frames at opposite ends thereof, said bed frames extending outwardly of said U-shaped tubular frames on opposite sides of said body beyond the floor thereof, means extending the upper end portions of said U-shaped frames and detachably connected thereto rigidly securing said U-shaped frames together, a canvas cover supported on said U-shaped frames and said bed frames enclosing all of said frames and said vehicle body, means on an uppermost pair of said bed frames at the side thereof opposite said U-shaped frames for supporting said canvas cover in spaced relation thereabout, a plurality of floor flanges secured to said floor adjacent each corner thereof, said tubular standards each comprising a pipe nipple threaded into each of said floor flanges and extending upwardly therefrom, and means extending to the lower ends of said U-shaped frames and said nipples releasably securing said U-shaped frames in telescopically overlying relation with respect to said nipples.

References Cited in the file of this patent

UNITED STATES PATENTS

| | | |
|---|---|---|
| 665,535 | Lein | Jan. 8, 1901 |
| 1,214,979 | Von Ahnen | Feb. 6, 1917 |
| 1,227,105 | Barnes | May 22, 1917 |
| 1,407,259 | Curtis | Feb. 21, 1922 |
| 1,961,915 | Salmen | June 5, 1935 |
| 2,481,230 | MacDonald | Sept. 5, 1949 |
| 2,641,776 | Jensen | June 16, 1953 |

FOREIGN PATENTS

| | | |
|---|---|---|
| 352,534 | Great Britain | July 10, 1934 |